United States Patent
Baykaner et al.

(10) Patent No.: US 11,551,442 B2
(45) Date of Patent: Jan. 10, 2023

(54) APPARATUS, METHOD AND SYSTEM FOR IDENTIFYING A TARGET OBJECT FROM A PLURALITY OF OBJECTS

(71) Applicant: Nokia Technologies Oy, Espoo (FI)

(72) Inventors: Khan Baykaner, Cambourne (GB); Troels Ronnow, Cambridge (GB); Hongwei Li, Cambridge (GB); Krishna Dubba, Bishops Stortford (GB)

(73) Assignee: NOKIA TECHNOLOGIES OY, Espoo (FI)

( * ) Notice: Subject to any disclaimer, the term of this patent is extended or adjusted under 35 U.S.C. 154(b) by 80 days.

(21) Appl. No.: 16/768,435

(22) PCT Filed: Dec. 14, 2018

(86) PCT No.: PCT/EP2018/084905
§ 371 (c)(1),
(2) Date: May 29, 2020

(87) PCT Pub. No.: WO2019/121377
PCT Pub. Date: Jun. 27, 2019

(65) Prior Publication Data
US 2020/0387709 A1  Dec. 10, 2020

(30) Foreign Application Priority Data
Dec. 22, 2017 (EP) .................... 17210391

(51) Int. Cl.
*G06F 3/16* (2006.01)
*G06V 20/20* (2022.01)
(Continued)

(52) U.S. Cl.
CPC .............. *G06V 20/20* (2022.01); *G06F 3/012* (2013.01); *G06F 3/0488* (2013.01); *G06F 3/167* (2013.01);
(Continued)

(58) Field of Classification Search
CPC .. G06K 9/00671; G06K 9/2081; G06F 3/012; G06F 3/0488; G06F 3/167; G06F 3/011; G06F 3/013
See application file for complete search history.

(56) References Cited

U.S. PATENT DOCUMENTS 9,497,534 B2   11/2016  Prest et al.
10,129,510 B2 *  11/2018  Ma .................... H04N 7/183
(Continued)

FOREIGN PATENT DOCUMENTS

EP   2980675 A2   2/2016

OTHER PUBLICATIONS

Manabe et al., "Using Earphones to Perform Gaze Detection for Wearable Interfaces", NTT Docomo Technical Journal, vol. 12, No. 3, Dec. 2010, pp. 12-17.
(Continued)

*Primary Examiner* — Phuong H Nguyen
(74) *Attorney, Agent, or Firm* — Alston & Bird LLP (57) ABSTRACT

An apparatus comprising a processor and memory including computer program code, the memory and computer program code configured to, with the processor, enable the apparatus at least to: identify a target object, from a plurality of objects, which is within a field of view of a first user based on a determined location and orientation of the first user relative to respective predefined locations of the plurality of objects; and generate a command signal configured to trigger a corresponding action associated with the target object.

19 Claims, 3 Drawing Sheets

(51) Int. Cl.
*G06F 3/01* (2006.01)
*G06F 3/0488* (2022.01)
*G06V 10/22* (2022.01)
*H04W 12/63* (2021.01)

(52) U.S. Cl.
CPC ............ *G06V 10/235* (2022.01); *G06F 3/011* (2013.01); *G06F 3/013* (2013.01); *H04W 12/63* (2021.01)

(56) References Cited

U.S. PATENT DOCUMENTS

| | | | |
|---|---|---|---|
| 2011/0141011 A1* | 6/2011 | Lashina | G06F 3/013 345/156 |
| 2012/0002822 A1 | 1/2012 | Peissig et al. | |
| 2013/0322667 A1 | 12/2013 | Christensen | |
| 2014/0010391 A1 | 1/2014 | Ek et al. | |
| 2014/0152538 A1* | 6/2014 | Ham | G06F 3/038 345/156 |
| 2014/0362201 A1 | 12/2014 | Nguyen et al. | |
| 2016/0037573 A1* | 2/2016 | Ko | G06F 3/012 455/41.2 |
| 2016/0077710 A1* | 3/2016 | Lewis | G06F 3/011 715/716 |
| 2017/0359456 A1 | 12/2017 | Shrubsole et al. | |

OTHER PUBLICATIONS

Zhang et al., "HOBS: Head Orientation-based Selection in Physical Spaces", ACM Symposium on Spatial User Interaction (SUI), Oct. 2014, 9 pages.

"Smart Earbud Lets You Control Your Phone with Just a Smile", Wareable, Retrieved on May 27, 2020, Webpage available at: https://www.wareable.com/hearables/smart-earbud-control-phone-smile-4250.

Partial European Search Report received for corresponding European Patent Application No. 17210391.3, dated Jun. 5, 2018, 13 pages.

Extended European Search Report received for corresponding European Patent Application No. 17210391.3, dated Jul. 31, 2018, 14 pages.

International Search Report and Written Opinion received for corresponding Patent Cooperation Treaty Application No. PCT/EP2018/084905, dated Mar. 18, 2019, 17 pages.

Office action received for corresponding Indian Patent Application No. 202047031201, dated Jul. 20, 2021, 7 pages.

Office action received for corresponding European Patent Application No. 17210391.3, dated Aug. 18, 2021, 10 pages.

* cited by examiner

APPARATUS, METHOD AND SYSTEM FOR IDENTIFYING A TARGET OBJECT FROM A PLURALITY OF OBJECTS

RELATED APPLICATION

This application claims priority to PCT Application No. PCT/EP2018/084905, filed on Dec. 14, 2018, which claims priority to European Application No. 17210391.3, filed on Dec. 22, 2017, each of which is incorporated herein by reference in its entirety.

TECHNICAL FIELD

The present disclosure relates to an apparatus and associated method for use in interacting with a plurality of objects. In some examples, the apparatus is configured to identify a target object, from the plurality of objects, which is within a field of view of a first user based on a determined location and orientation of the first user relative to respective predefined locations of the plurality of objects, and generate a command signal configured to trigger a corresponding action associated with the target object.

Some embodiments may relate to portable electronic devices, in particular, so-called hand-portable electronic devices which may be hand-held in use (although they may be placed in a cradle in use). Such hand-portable electronic devices include so-called Personal Digital Assistants (PDAs) and tablet PCs. The portable electronic devices/apparatus according to one or more disclosed example aspects/embodiments may provide one or more audio/text/video communication functions (e.g. tele-communication, video-communication, and/or text transmission, Short Message Service (SMS)/Multimedia Message Service (MMS)/emailing functions, interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture function (e.g. using a (e.g. in-built) digital camera), and gaming functions.

BACKGROUND

Research is currently being done to develop the internet of things (IoT), which allows a plurality of connected objects to be sensed or controlled remotely across an existing network infrastructure.

The listing or discussion of a prior-published document or any background in this specification should not necessarily be taken as an acknowledgement that the document or background is part of the state of the art or is common general knowledge.

SUMMARY

According to a first aspect, there is provided an apparatus comprising a processor and memory including computer program code, the memory and computer program code configured to, with the processor, enable the apparatus at least to:
identify a target object, from a plurality of objects, which is within a field of view of a first user based on a determined location and orientation of the first user relative to respective predefined locations of at least some of the plurality of objects; and
generate a command signal configured to trigger a corresponding action associated with the target object.

One or more of the plurality of objects may have a respective interaction zone within which the first user is able to interact with the object, and the target object may be identified based on the determined location of the first user relative to the respective interaction zones of the one or more of the plurality of objects.

The determined orientation may comprise one or more of the first user's head, body and eyes.

Location and orientation data of the first user may be received from one or more devices external to the apparatus.

The memory and computer program code may be configured to, with the processor, enable the apparatus to generate the command signal automatically on identification of the target object or in response to a user input received from the first user.

The user input may be a touch input, a gesture input or a voice input received from the first user.

The memory and computer program code may be configured to, with the processor, enable the apparatus to access a list of actions for one or more of the plurality of objects that can be triggered by the apparatus in response to the corresponding command signals.

The generated command signal may be configured to trigger one or more of the following actions by the target object: power-up, unlock, activation of a feature, provision of information, and sending of a message from the first user to one or more further users currently gazing at the target object.

The generated command signal may be configured to cause the target object to allow one or more further users to interact with the target object according to respective permissions allocated to the one or more further users by the first user or the apparatus.

The memory and computer program code may be configured to, with the processor, enable the apparatus to allocate the respective permissions to the one or more further users based on at least one of their proximity to the first user, their location and orientation relative to the location of the target object, and their relationship with the first user.

The memory and computer program code may be configured to, with the processor, enable the apparatus to request approval of the allocated permissions from the first user.

The memory and computer program code may be configured to, with the processor, enable the apparatus to identify the one or more further users based on at least one of location data and a user input associated with each of the further users, and store the identities of the one or more further users together with their respective permissions and/or interactions with the target object.

The memory and computer program code may be configured to, with the processor, enable the apparatus to output the identities of the identified further users together with their respective permissions and/or interactions with the target object, or send the identities of the identified further users together with their respective permissions and/or interactions with the target object to a device associated with the first user for output.

The memory and computer program code may be configured to, with the processor, enable the apparatus to receive the respective predefined locations of the one or more of the plurality of objects from said one or more objects or a central device.

The apparatus may be one or more of an electronic device, a portable electronic device, a portable telecommunications device, a mobile phone, a personal digital assistant, a tablet, a phablet, a desktop computer, a laptop computer, a server, a smartphone, a smartwatch, smart eyewear, headphones, a virtual assistant device, a router, a wireless access point, and a module for one or more of the same.

The plurality of objects may comprise one or more of an electrical appliance, an electronic device, a portable electronic device, a portable telecommunications device, a mobile phone, a personal digital assistant, a tablet, a phablet, a desktop computer, a laptop computer, a smartphone, a virtual assistant device, a television, a monitor, a hi-fi, a loudspeaker, an artefact, and a work of art.

The location data may comprise data captured using one or more of a video camera, GPS, radar, lidar, WiFi and Bluetooth LE, and the orientation data may comprise data captured using one or more of an accelerometer, a gyroscope, a magnetometer, a compass, a head tracker and an eye tracker.

According to a further aspect, there is provided a method comprising:
- identifying a target object, from a plurality of objects, which is within a field of view of a first user based on a determined location and orientation of the first user relative to respective predefined locations of at least some of the plurality of objects; and
- generating a command signal configured to trigger a corresponding action associated with the target object.

According to a further aspect, there is provided a system comprising:
- a first apparatus configured to transmit a request to a second apparatus, remote from the first apparatus;
- in response to receiving the request, the second apparatus configured to:
  - identify a target object, from a plurality of objects, which is within a field of view of a first user based on a determined location and orientation of the first user relative to respective predefined locations of at least some of the plurality of objects; and
    - generate a first command signal configured to trigger a corresponding action associated with the target object; or
    - transmit a message comprising the identity of the identified target object to one or more of the first apparatus and a further apparatus;
  - in response to receiving the identity of the identified target object, the first apparatus and/or the further apparatus respectively further configured to generate a second command signal configured to trigger a corresponding action associated with the target object.

The steps of any method disclosed herein do not have to be performed in the exact order disclosed, unless explicitly stated or understood by the skilled person.

Corresponding computer programs for implementing one or more steps of the methods disclosed herein are also within the present disclosure and are encompassed by one or more of the described example embodiments.

One or more of the computer programs may, when run on a computer, cause the computer to configure any apparatus, including a battery, circuit, controller, or device disclosed herein or perform any method disclosed herein. One or more of the computer programs may be software implementations, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software may be an assembly program.

One or more of the computer programs may be provided on a computer readable medium, which may be a physical computer readable medium such as a disc or a memory device, or may be embodied as a transient signal. Such a transient signal may be a network download, including an internet download.

The present disclosure includes one or more corresponding aspects, example embodiments or features in isolation or in various combinations whether or not specifically stated (including claimed) in that combination or in isolation. Corresponding means for performing one or more of the discussed functions are also within the present disclosure.

The above summary is intended to be merely exemplary and non-limiting.

BRIEF DESCRIPTION OF THE FIGURES

A description is now given, by way of example only, with reference to the accompanying drawings, in which:—

DESCRIPTION OF SPECIFIC ASPECTS/EMBODIMENTS

The IoT is a network of physical devices, vehicles, home appliances, and other objects embedded with electronics, software, sensors, actuators, and network connectivity which enable these objects to connect and exchange data. Each object is uniquely identifiable through its embedded computing system but is able to inter-operate within the existing Internet infrastructure.

The IoT allows objects to be sensed or controlled remotely across the network, creating opportunities for more direct integration of the physical world into computer-based systems, and resulting in improved efficiency, accuracy and economic benefit in addition to reduced human intervention. When IoT is augmented with sensors and actuators, the technology becomes an instance of the more general class of cyber-physical systems, which also encompasses technologies such as smart grids, virtual power plants, smart homes, intelligent transportation and smart cities.

IoT devices are a part of the larger concept of home automation, also known as domotics. Large smart home systems utilize a main hub or controller to provide users with a central control for all of their devices. These devices can include lighting, heating and air conditioning, media and security systems. Ease of usability is the most immediate benefit to connecting these functionalities. Long term benefits can include the ability to create a more environmentally friendly home by automating some functions such as ensuring lights and electronics are turned off.

Figure 1:
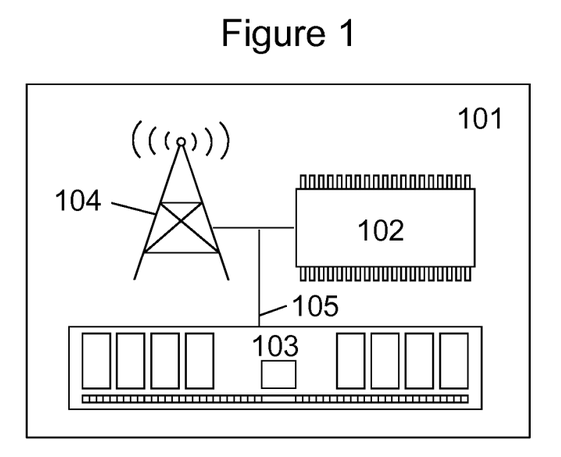
FIG. 1 shows one example of the present apparatus.

FIG. 1 shows an example apparatus 101 comprising a processor 102, memory 103 (including computer program code) and transceiver 104 which are electrically connected to one another by a data bus 105. Furthermore, the apparatus 101 may be one or more of an electronic device, a portable electronic device, a portable telecommunications device, a mobile phone, a personal digital assistant, a tablet, a phablet, a desktop computer, a laptop computer, a server, a smartphone, a smartwatch, smart eyewear, headphones, a virtual assistant device, a router, a wireless access point, and a module for one or more of the same.

The processor 102 may be configured for general operation of the apparatus 101 by providing signalling to, and receiving signalling from, the other components to manage their operation. The memory 103 may be configured to store computer code configured to perform, control or enable operation of the apparatus 101. The memory 103 may also be configured to store settings for the other components. The processor 102 may access the memory 103 to retrieve the component settings in order to manage the operation of the other components. The transceiver 104 is configured to transmit data to, and receive data from, one or more other devices via a wired and/or wireless connection.

Figure 2:
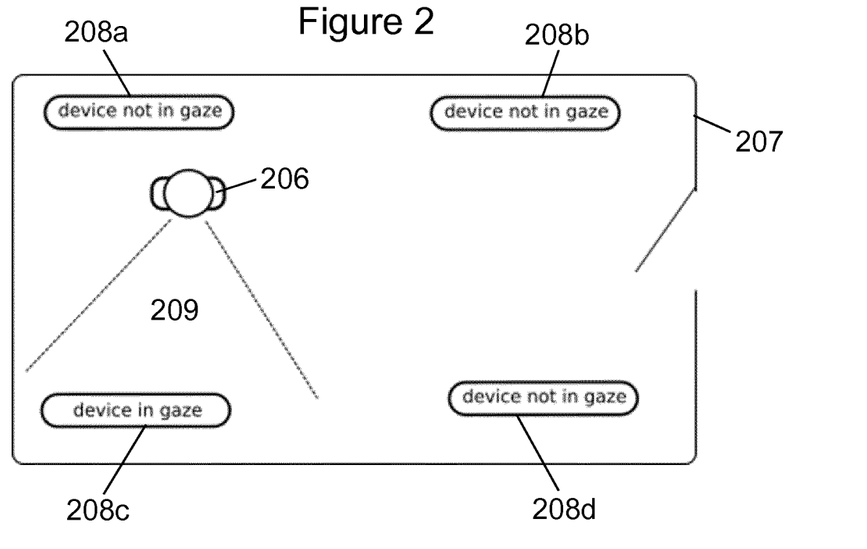
FIG. 2 shows the identification of a target object within a field of view of a first user from a plurality of objects.

FIG. 2 shows one scenario to which the present apparatus may be applied. In this scenario, a first user 206 is located in a room 207 comprising a plurality of objects 208a-d, and the apparatus (not shown) is at least part of a central device configured to communicate with the plurality of objects 208a-d. For example, the room 207 may be the first user's living room, the plurality of objects 208a-d may be home appliances, and the apparatus may be a virtual assistant device with a dialogue agent. The apparatus is configured to identify a target object 208c, from the plurality of objects 208a-d, which is within a field of view 209 of the first user 206 based on a determined location and orientation of the first user 206 relative to respective predefined locations of the plurality of objects 208a-d.

The term 'predefined' is used herein to mean that the apparatus that is configured to identify the target object has access to location data which has been established for one or more of the plurality of objects. The plurality of objects 208a-d objects may have a dynamic configuration in that one or more of the plurality of objects 208a-d may be moved over time. If an object 208a-d is moved, its respective location data is updated and made available to the apparatus once the location has been re-established. For example if a user chooses to relocate object 208a, location data for object 208 may be updated either automatically if the object is configured to be connected to a central device such as server that stores the location data, or manually updated by a user inputting the new location for storage, either to the central device or the apparatus that is configured to identify the target object 208c. Therefore even if one or more of the plurality of objects 208a-d are moved, the respective locations remain predetermined, at least from the perspective of the apparatus configured to identify the target device 208c.

Once the target object 208c has been identified, the apparatus is configured to generate a command signal to trigger a corresponding action associated with the target object 208c. The apparatus therefore allows the first user 206 to interact with the target object 208c simply by looking at it, which facilitates management of the network.

The apparatus could be implemented in homes, offices, museums, art galleries or any other location in which one or more users 206 may be expected to interact with a plurality of objects 208a-d. As such, the plurality of objects 208a-d may comprise one or more of an electrical appliance, an electronic device, a portable electronic device, a portable telecommunications device, a mobile phone, a personal digital assistant, a tablet, a phablet, a desktop computer, a laptop computer, a smartphone, a virtual assistant device, a television, a monitor, a hi-fi, a loudspeaker, an artefact and a work of art (but are not limited to these examples).

The apparatus may be configured to determine the location and orientation of the first user 206 based on received location and orientation data, respectively. This location and orientation data may be received from other components of the apparatus itself, or from one or more devices external to the apparatus. For example, the location data may comprise data captured using one or more of a video camera, GPS, radar, lidar, WiFi and Bluetooth LE. Furthermore, the apparatus may be configured to identify the target object 208c based on a determined orientation of one or more of the first user's head, body and eyes. The orientation data may therefore comprise data captured using one or more of an accelerometer, a gyroscope, a magnetometer, a compass, a head tracker and an eye tracker.

Also, the apparatus may be configured to receive the respective predefined locations of the plurality of objects 208a-d from said objects 208a-d. For example, each object 208a-d may be configured to send details of its current location to the apparatus. This may occur automatically on connection of the objects 208a-d to the apparatus and/or periodically over time to account for changes in object location. Alternatively, each object 208a-d may be configured to send details of its current location to the apparatus in response to a request from the apparatus.

Rather than the apparatus receiving the respective predefined locations of the plurality of objects 208a-d from the objects 208a-d themselves, this information could be received from a central device (e.g. a server) configured to store location data for each of the plurality of objects 208a-d. One example of this may be a server at a museum or art gallery which is configured to store location and audio data for each of the different exhibits (artefacts or works or art). Before or after the first user enters the museum or art gallery, he/she may download this location and audio data from the server (e.g. via an application or website). Once the target exhibit has been identified using the location data, the apparatus may be configured to generate a command signal which triggers the playback of audio data providing factual information about the target exhibit to the first user. This audio data may be output via a loudspeaker adjacent the target exhibit, or via an audio headset worn by the first user.

In scenarios where multiple objects 208a-d are in close proximity to one another, there may be more than one object 208a-d within the field of view 209 of the first user 206. In these scenarios, the apparatus may be configured to identify the target object 208c as the object having the respective predefined location which is closest to the centre of the field of view 209. This is because the first user would typically gaze directly at the object 208c which he/she wished to interact with.

There may also be scenarios where it is not possible for the first user 206 to interact with an object 208a-d from any location within the vicinity of that object 208a-d. For example, some objects 208a-d may require the first user 206 to be within a particular distance of the object 208a-d, or to look at the object 208a-d from a particular position, to enable said interaction. To account for these scenarios, each object 208a-d may have a respective interaction zone within which the first user 206 is able to interact with the object 208a-d, and the apparatus may be configured to identify the target object 208c further based on the determined location of the first user 206 relative to the respective interaction zones of the plurality of objects 208a-d.

Figure 3A:
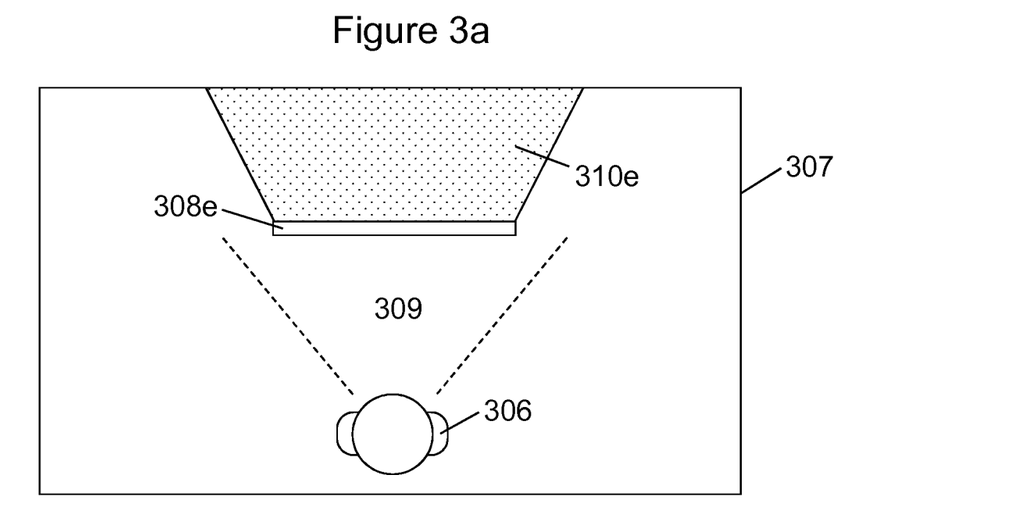
FIG. 3a shows an interaction zone of an object within which the first user is able to interact with the object.

FIG. 3a shows a scenario where there is a television 308e within the field of view 309 of the first user 306, but the television 308e is facing away from the first user 306 such that he/she cannot see the electronic display of the television 308e. This situation may arise if the television 308e was located on a table or plinth within a room 307 rather than on a wall of the room 307. Here, the television 308e has a predefined interaction zone 310e within which the first user 306 should be able to view the electronic display clearly (e.g. based on recommended viewing distances/angles for the television 308e). Since the first user 306 is not currently located within the predefined interaction zone 310e, however, the apparatus would not identify the television 308e as the target object.

Figure 3B:
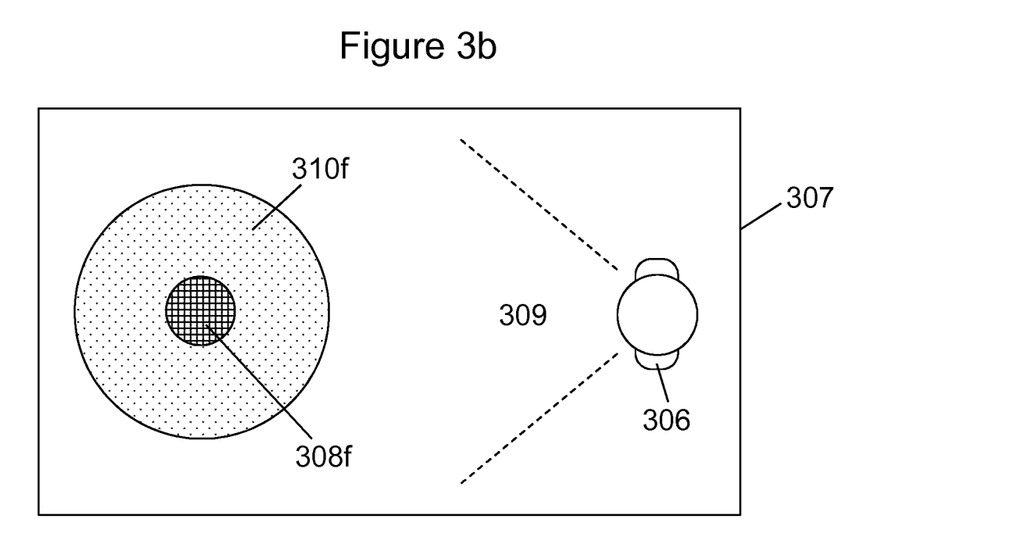
FIG. 3b shows an interaction zone of another object within which the first user is able to interact with the object.

FIG. 3b shows another scenario where there is a loudspeaker 308f within the field of view 309 of the first user 306 but located on the other side of the room 307 from the first user 306. If the room 307 was relatively large, it may be difficult for the first user 306 to hear the audio output from the loudspeaker 308f. As such, the loudspeaker 308f has a predefined interaction zone 310f within which the first user 306 should be able to hear the audio output from the loudspeaker 308f clearly (e.g. based on recommended listening distances/angles for the loudspeaker 308f). Since the first user 306 is not currently located within the predefined interaction zone 310f, however, the apparatus would not identify the loudspeaker 308f as the target object.

Depending on the particular action, the present apparatus may be configured to generate the command signal automatically on identification of the target object or in response to a user input received from the first user (e.g. a touch input, gesture and/or voice command from the first user). For example, the gaze of the first user alone may be sufficient to power-up or unlock the target object, but an additional user input may be required to activate a particular feature or obtain information. In this respect, the apparatus may comprise a list of actions for each object that can be triggered by the apparatus in response to the corresponding command signals and/or accepted user inputs. The list of actions may be predefined, for example set by manufacturer of the object, a user or an administrator. The list of actions may be updated over time to add, remove, replace, or modify one or more respective actions that can be triggered by the apparatus in response to the corresponding command signals and/or accepted user inputs.

Figure 4:
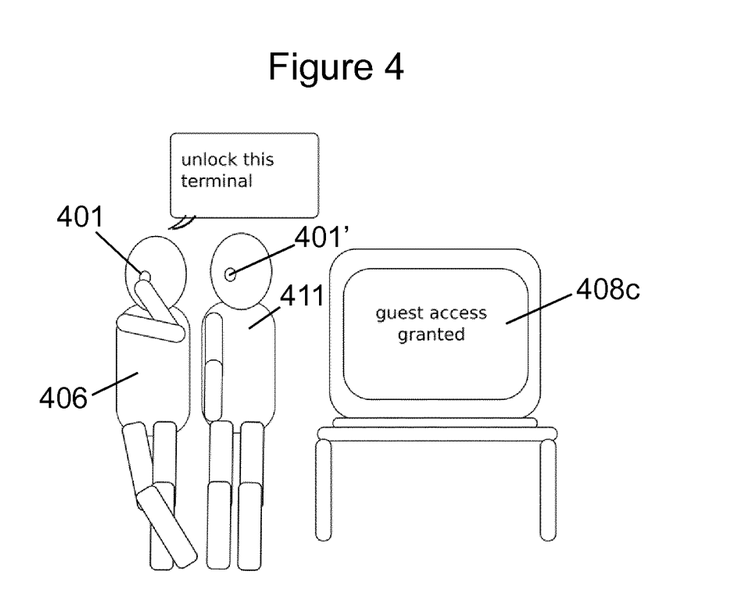
FIG. 4 shows the triggering of an action by the target object in response to a user input.

FIG. 4 shows the triggering of an action by the target object 408c in response to a user input. In this example, the apparatus 401 comprises one or more earbuds (e.g. an earbud in one or both ears of the first user 406), the target object 408c is a computer, and the first user 406 has input the voice command "unlock this terminal" while pressing a button on the earbuds 401. On detection of the user input (i.e. the voice command in combination with the touch input), the earbuds 401 are configured to generate and send a command signal to the computer 408c causing it to unlock and provide access to the first user 406. Similarly, if the target object 408c was a hi-fi and the first user 406 was to input the voice command "play music" or similar, the earbuds 401 may be configured to generate and send a corresponding command signal which triggers the hi-fi to switch on the radio function. As another example, if the target object 408c was a television and the first user 406 was to input the voice command "weather forecast" or similar, the earbuds 401 may be configured to generate and send a corresponding command signal which triggers the television to provide an audio and/or visual presentation of the upcoming weather predictions.

The earbuds could have built-in inertial measurement units (e.g. an accelerometer, gyroscope, magnetometer or compass) for determining the orientation of the first user's head. In this way, the earbuds 401 could provide the orientation data in addition to identifying the target object 408c and generating the command signal. In some cases, the earbuds 401 may also have built-in position sensors (e.g. GPS, WiFi or Bluetooth LE) for determining the location of the first user 406, and may be configured to receive user inputs by incorporating a button (for detecting a touch input), capacitive sensor (for detecting a gesture) or microphone (for detecting a voice command). This would allow a single device to provide the complete functionality described herein, but could increase the size and cost of the apparatus 401. Other suitable form factors for the present apparatus 401 include a hat, headband or smart eyewear which could also incorporate the above-mentioned features.

One or both of a pair of earbuds may comprise the apparatus features as described above, namely the processor 102, memory 103, transceiver 104. Alternatively, one of a pair of earbuds may comprise some, but not all, of the apparatus features e.g. only one of the pair of earbuds may comprise transmission means while the other one does not. Any one or more earbuds comprising any suitable combination of the above apparatus features, and optionally any one or more of the built-in inertial measurement units and/or built-in position sensors, may be referred to as a "smart" earbud (or earbuds).

In the example of FIG. 4, a second user 411 is in proximity to the first user 406 as the first user 406 provides the user input. As such, the second user 411 may be able to access the target object 408c when it is unlocked to the first user 406. This may be beneficial if the first user 406 wishes to share information on the target object 408c with the second user 411 or demonstrate a feature of the target object 408c to the second user 411. The apparatus 401 may also be configured to determine the location and orientation of the second user 411 (as described above in relation to the first user 406) to determine if the second user 411 is currently gazing at the target object 408c of the first user 406. In this example, the apparatus further comprises one or more earbuds 401' worn by the second user 411 for determining the location and orientation of the second user 411. If the apparatus 401 determines that the second user 411 is currently gazing at the target object 408c, the generated command signal may be configured to trigger the sending of a text message or email from the first user 406 to the second user 411 on receipt of a corresponding user input (e.g. "send this" voice command or similar).

In some cases, the generated command signal may be configured to cause the target object 408c to allow one or more further users to interact with the target object 408c according to respective permissions allocated to the one or more further users by the first user 406 or the apparatus 401. The respective permissions may comprise access rights with or without corresponding time constraints, which may be useful for hot-desking situations in an office. In the scenario of FIG. 4, for instance, the command signal generated by the apparatus 401 may be configured to unlock the target object 408c for a predefined time period to provide access to the second user 411 as well as the first user 406 during this time period.

In cases where the respective permissions are allocated to the one or more further users by the apparatus 401 itself, these may be based on at least one of the proximity of the further users to the first user 406, their location and orientation relative to the location of the target object 408c, and their relationship with the first user 406 (e.g. from stored relationship information about the users). For example, the proximity of the second user 411 to the first user 406 in FIG. 4 may indicate a working relationship between the first 406 and second 411 users which requires both users 406, 411 to have at least partial access to the target object 408c.

There may be situations where a further user should not have access to the target object 408c of the first user 406, however. For instance, the first user 406 may wish to view his/her bank account information on an electronic display without anyone else being able to see this information. To address this issue, the apparatus 401 may be configured to request approval from the first user 406 of the permissions allocated by the apparatus 401. Additionally or alternatively, the apparatus 401 may be configured to identify the one or more further users (e.g. based on location data captured using a video camera or a user input captured using voice-recognition software), and store the identities of the one or more further users together with their respective permissions and/or interactions with the target object 408c. The interactions of the further users with the target object 408c may include use of the target object 408c by the further users, or the granting of access by these further users to additional users. In some cases, the apparatus 401 may be configured to output the identities of the identified further users together with their respective permissions and/or interactions with the target object 408c, or send the same to another device associated with the first user 406 (e.g. smartphone, tablet or laptop) for output. The information may be output to the user by a combination of the apparatus 401 and a user device (e.g. earbuds 401 provide audio output and a paired smartphone provides visual output).

These security features may help to prevent accidental or malicious access to the target object 408c, which may be useful when the first user 406 is unaware of the proximity of a further user. In the banking scenario described above, the first user 406 may react to the information sent by the apparatus 401 by shielding the electronic display or logging out of his/her bank account to prevent the account information from being seen by the further user. In some cases, the first user 406 may decline or remove the permissions allocated to the further user.

The above-mentioned security features may only be activated when the apparatus 401 is unsure about whether a further user should have access to the target object 408c of the first user 406 or not. For example, the apparatus 401 may be configured to calculate a confidence score for each of the further users (e.g. based on at least one of the proximity of the further users to the first user 406, their location and orientation relative to the location of the target object 408c, and their relationship with the first user 406) and activate the security features if the calculated confidence score falls within a predefined range of confidence (i.e. neither high nor low).

Instead of a single apparatus configured to both identify the target object and generate the command signal to trigger a corresponding action associated with the target object, this functionality may be distributed between multiple apparatuses (not shown). For example, a first apparatus (e.g. a low powered device such as a pair of earbuds) may be configured to send a request to identify the target object to a second apparatus (e.g. a more powerful device such as a smartphone, tablet PC, server or home hub). In this example, the second apparatus then identifies the target object (assuming it has access to the relevant location and orientation data) and either generates the command signal itself, or transmits a message comprising the identity of the target object to the first apparatus and/or a further apparatus (e.g. another device specified by the user such as a smartphone, tablet, PC, server or home hub) such that the first apparatus and/or further apparatus can generate the command signal. In some cases, the first apparatus may provide the location and orientation data to the second apparatus together with the request.

Distributing the functionality between multiple apparatuses may be useful when the processing power of the first apparatus is insufficient for identifying the target object or is relatively limited in comparison to the second apparatus, as the more demanding step is offloaded from the first apparatus to the second apparatus.

Figure 5:
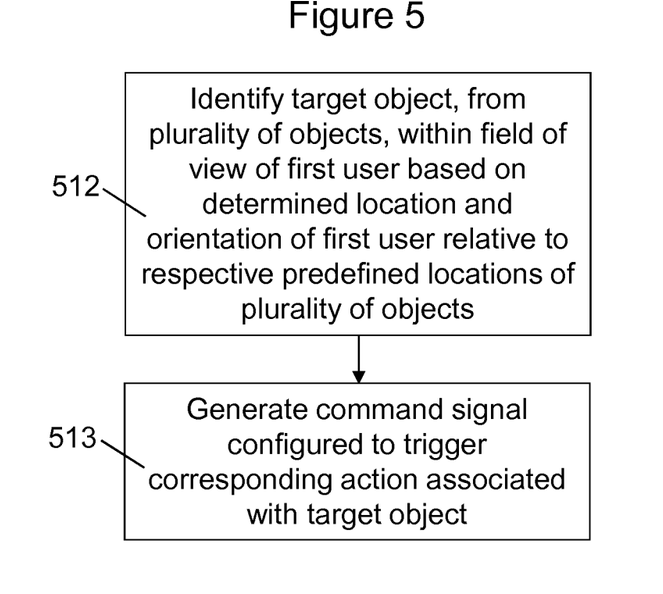
FIG. 5 shows the method described herein.

FIG. 5 shows the main steps 512-513 of the method described herein. The method generally comprises: identifying a target object, from a plurality of objects, which is within a field of view of a first user based on a determined location and orientation of the first user relative to respective predefined locations of the plurality of objects 512; and generating a command signal configured to trigger a corresponding action associated with the target object 513.

Figure 6:
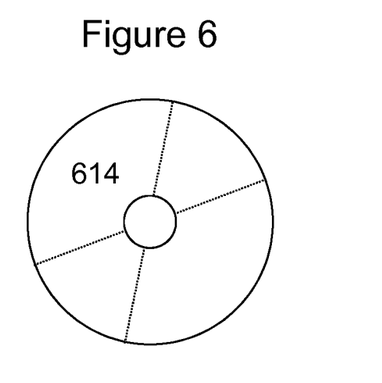
FIG. 6 shows a computer-readable medium comprising a computer program configured to perform, control or enable the method of FIG. 5.

FIG. 6 shows a computer/processor readable medium 614 providing a computer program. The computer program may comprise computer code configured to perform, control or enable one or more of the method steps 512-513 of FIG. 5 using at least part of the apparatus described herein. In this example, the computer/processor readable medium 614 is a disc such as a digital versatile disc (DVD) or a compact disc (CD). In other embodiments, the computer/processor readable medium 614 may be any medium that has been programmed in such a way as to carry out an inventive function. The computer/processor readable medium 614 may be a removable memory device such as a memory stick or memory card (SD, mini SD, micro SD or nano SD).

Other embodiments depicted in the figures have been provided with reference numerals that correspond to similar features of earlier described embodiments. For example, feature number 1 can also correspond to numbers 101, 201, 301 etc. These numbered features may appear in the figures but may not have been directly referred to within the description of these particular embodiments. These have still been provided in the figures to aid understanding of the further embodiments, particularly in relation to the features of similar earlier described embodiments.

It will be appreciated to the skilled reader that any mentioned apparatus/device and/or other features of particular mentioned apparatus/device may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on one or more memories/processors/functional units.

In some embodiments, a particular mentioned apparatus/device may be pre-programmed with the appropriate software to carry out desired operations, and wherein the appropriate software can be enabled for use by a user downloading a "key", for example, to unlock/enable the software and its associated functionality. Advantages associated with such embodiments can include a reduced requirement to download data when further functionality is required for a device, and this can be useful in examples where a device is perceived to have sufficient capacity to store such pre-programmed software for functionality that may not be enabled by a user.

It will be appreciated that any mentioned apparatus/ circuitry/elements/processor may have other functions in addition to the mentioned functions, and that these functions may be performed by the same apparatus/circuitry/elements/ processor. One or more disclosed aspects may encompass the electronic distribution of associated computer programs and computer programs (which may be source/transport encoded) recorded on an appropriate carrier (e.g. memory, signal).

It will be appreciated that any "computer" described herein can comprise a collection of one or more individual processors/processing elements that may or may not be located on the same circuit board, or the same region/ position of a circuit board or even the same device. In some embodiments one or more of any mentioned processors may be distributed over a plurality of devices. The same or different processor/processing elements may perform one or more functions described herein.

It will be appreciated that the term "signalling" may refer to one or more signals transmitted as a series of transmitted and/or received signals. The series of signals may comprise one, two, three, four or even more individual signal components or distinct signals to make up said signalling. Some or all of these individual signals may be transmitted/received simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

While there have been shown and described and pointed out fundamental novel features as applied to different embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising:
   at least one processor; and
   at least one memory including computer program code,
   the at least one memory and the computer program code configured to, with the at least one processor, cause the apparatus at least to perform:
   identifying a target object, from a plurality of objects, which is within a field of view of a first user based on a determined location and orientation of one or both of a head or a body of the first user relative to respective predefined locations of at least some of the plurality of objects, wherein the location and orientation of one or both of the head or the body of the first user are determined using one or more inertial measurements;
   generating a command signal configured to trigger a corresponding action associated with the target object; and
   identifying one or more further users based on at least one of location data or a user input associated with respective ones of the one or more further users, and storing the identities of the one or more further users together with at least one of respective permissions or respective interactions with the target object.

2. The apparatus of claim 1, wherein one or more of the plurality of objects has a respective interaction zone within which the first user is able to interact with the object, and wherein the target object is identified based on the determined location of the first user relative to the respective interaction zones of the one or more of the plurality of objects.

3. The apparatus of claim 1, wherein location and orientation data of the first user are received from one or more of an accelerometer, a gyroscope, a magnetometer, a compass, or a head tracker.

4. The apparatus of claim 1, wherein the at least one memory and the computer program code are configured to, with the at least one processor, cause the apparatus at least to further perform: generating the command signal automatically on identification of the target object or in response to a user input received from the first user.

5. The apparatus of claim 4, wherein the user input is a touch input, a gesture input or a voice input received from the first user.

6. The apparatus of claim 1, wherein the at least one memory and the computer program code are configured to, with the at least one processor, cause the apparatus at least to further perform: accessing a list of actions for one or more of the plurality of objects that can be triggered by the apparatus in response to the corresponding command signals.

7. The apparatus of claim 1, wherein the at least one memory and the computer program code are configured to, with the at least one processor, cause the apparatus at least to further perform: allocating the respective permissions to the one or more further users based on at least one of their proximity to the first user, their location and orientation relative to the location of the target object, and their relationship with the first user.

8. The apparatus of claim 1, wherein the at least one memory and the computer program code are configured to, with the at least one processor, cause the apparatus at least to further perform: outputting the identities of the identified further users together with their respective permissions and/or interactions with the target object, or sending the identities of the identified further users together with their respective permissions and/or interactions with the target object to a device associated with the first user for output.

9. The apparatus of claim 1, wherein the at least one memory and the computer program code are configured to, with the at least one processor, cause the apparatus at least to further perform: receiving the respective predefined locations of the one or more of the plurality of objects from said one or more objects or a central device.

10. The apparatus of claim 1, wherein the at least one memory and the computer program code are configured to, with the at least one processor, cause the apparatus at least to further perform: identifying the target object, from the plurality of objects, which is within the field of view of the first user and within a field of view of a second user, based on a respective determined location and orientation of the first user and the second user relative to respective predefined locations of at least some of the plurality of objects.

11. The apparatus of claim 1, wherein identifying the target object is based at least on one of (i) the determined location of the first user to be within a particular distance of the object or (ii) the first user to view the target object from a particular orientation.

12. The apparatus of claim 1, wherein the respective predefined locations indicate location data established for at least some of the plurality of objects, and wherein the location data is accessible to the apparatus.

13. The apparatus of claim 1, wherein the one or more inertial measurements are received from a wearable device.

14. The apparatus of claim 13, wherein the wearable device comprises one or more of: an accelerometer, a gyroscope, a magnetometer, or a compass.

15. A non-transitory computer readable medium comprising program instructions stored thereon for performing at least the following:
identifying a target object, from a plurality of objects, which is within a field of view of a first user based on a determined location and orientation of one or both of a head or a body of the first user relative to respective predefined locations of at least some of the plurality of objects, wherein the location and orientation of one or both of the head or the body of the first user are determined using one or more inertial measurements;
generating a command signal configured to trigger a corresponding action associated with the target object; and
identifying one or more further users based on at least one of location data or a user input associated with respective ones of the one or more further users, and storing the identities of the one or more further users together with at least one of respective permissions or respective interactions with the target object.

16. The non-transitory computer readable medium of claim 15, further comprising program instructions stored thereon for performing at least:
identifying the target object, from the plurality of objects, which is within the field of view of the first user and within a field of view of a second user, based on a respective determined location and orientation of the first user and the second user relative to respective predefined locations of at least some of the plurality of objects.

17. The non-transitory computer readable medium of claim 15, wherein the generated command signal is configured to cause the target object to allow one or more further users to interact with the target object according to respective permissions allocated to the one or more further users by the first user or the apparatus.

18. A system comprising:
a first apparatus configured to transmit a request to a second apparatus, remote from the first apparatus;
in response to receiving the request, the second apparatus configured to:
identify a target object, from a plurality of objects, which is within a field of view of a first user based on a determined location and orientation of one or both of a head or a body of the first user relative to respective predefined locations of at least some of the plurality of objects, wherein the location and orientation of one or both of the head or the body of the first user are determined using one or more inertial measurements;
generate a first command signal configured to trigger a corresponding action associated with the target object; or
transmit a message comprising the identity of the identified target object to one or more of the first apparatus and a further apparatus;
in response to receiving the identity of the identified target object, the first apparatus and/or the further apparatus respectively further configured to generate a second command signal configured to trigger a corresponding action associated with the target object; and
identify one or more further users based on at least one of location data or a user input associated with respective ones of the one or more further users, and storing the identities of the one or more further users together with at least one of respective permissions or respective interactions with the target object.

19. The system of claim 18, wherein the second apparatus is further configured to:
identify the target object, from the plurality of objects, which is within the field of view of the first user and within a field of view of a second user, based on a respective determined location and orientation of the first user and the second user relative to respective predefined locations of at least some of the plurality of objects.

* * * * *